United States Patent [19]

Orth

[11] 4,158,264
[45] Jun. 19, 1979

[54] AUDIO-VISUAL TEACHING APPARATUS

[76] Inventor: Joy H. Orth, 3906 Sabal Palm Dr., Vero Beach, Fla. 32960

[21] Appl. No.: 829,576

[22] Filed: Aug. 31, 1977

[51] Int. Cl.² .............................................. G09B 5/04
[52] U.S. Cl. ......................................... 35/35 C; 360/2
[58] Field of Search ............... 35/35 C, 35 B, 35 J, 35/8 A; 360/2

[56] References Cited
U.S. PATENT DOCUMENTS

| | | | |
|---|---|---|---|
| 2,603,006 | 7/1952 | MacChesney et al. | 35/35 C |
| 2,822,425 | 2/1958 | Hicks | 35/35 C UX |
| 2,849,542 | 8/1958 | MacChesney | 35/35 C X |
| 2,975,672 | 3/1961 | Shields | 35/35 C UX |
| 2,985,069 | 5/1961 | Sampson | 35/35 C UX |
| 3,185,776 | 5/1965 | Bender | 35/35 C UX |
| 3,215,036 | 11/1965 | Kirkconnell et al. | 35/35 C X |
| 3,255,537 | 6/1966 | Cole | 35/35 C |
| 3,369,308 | 2/1968 | Curran | 35/35 C |
| 3,712,973 | 1/1973 | Kral | 35/35 C X |
| 3,760,164 | 9/1973 | Kral | 35/35 C X |
| 3,767,208 | 10/1973 | Chernowitz | 35/35 C X |
| 3,821,519 | 6/1974 | Pietenpol | 35/35 C X |
| 3,823,492 | 7/1974 | Allain | 35/35 J |
| 3,840,896 | 10/1974 | Lorbergs | 35/35 C X |
| 3,938,139 | 2/1976 | Day | 35/35 B X |
| 4,007,547 | 2/1977 | Butler et al. | 35/35 C |
| 4,019,263 | 4/1977 | Sakuma | 35/35 C |

*Primary Examiner*—William H. Grieb
*Attorney, Agent, or Firm*—Richard D. Dixon

[57] ABSTRACT

This invention relates to an improvement in an audio-visual teaching apparatus of the type having an audio signal recorded on a magnetic strip attached to an opaque information card. When the card is transported past a playback system, the audio signal from the magnetic strip is decoded and reproduced in the form of an audible signal. The improvement includes the use of patterned alphanumeric apertures through the information card for storing the visual information thereon. A source of illumination is positioned behind the path of the information card for illuminating the alphanumeric apertures within the information card as the audio information is decoded and reproduced from the magnetic strip. A plurality of filters are interposed between the source of illumination and the viewer for controlling the color of the illumination passing between, whereby the viewer may select the color in which the visual information is to be displayed in order to improve the learning process.

17 Claims, 4 Drawing Figures

U.S. Patent  Jun. 19, 1979  4,158,264
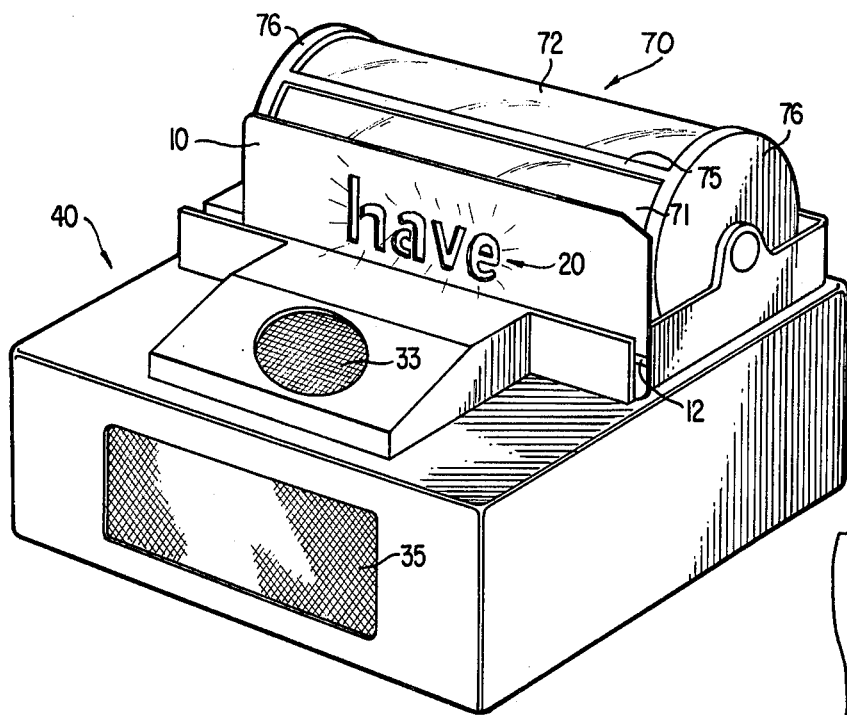
FIG.1
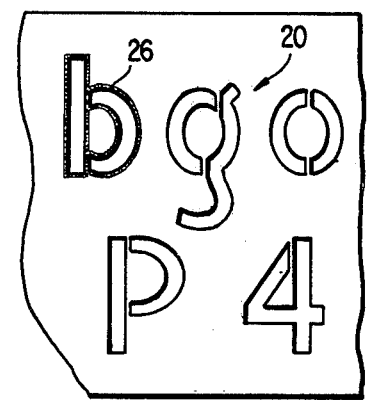
FIG.4
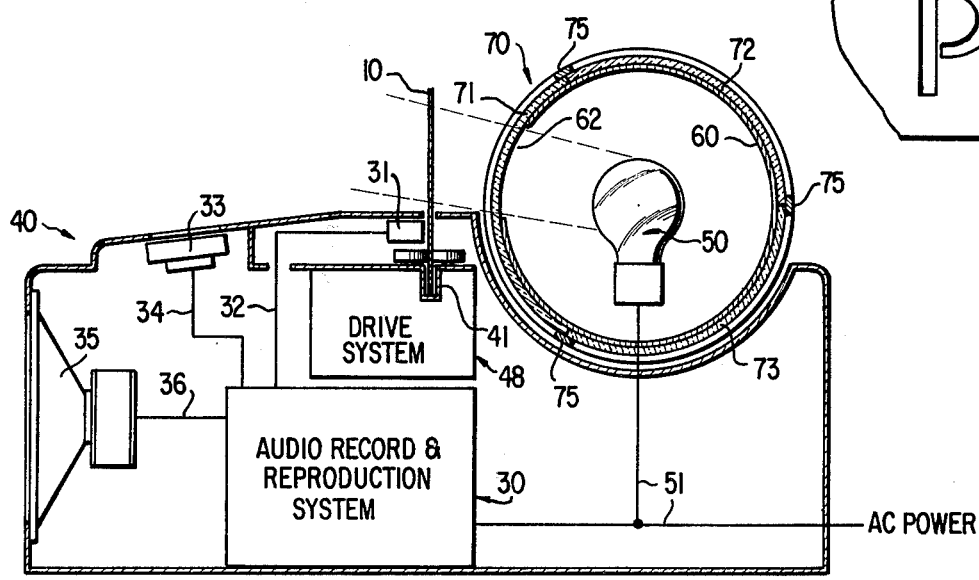
FIG.2
FIG.3

AUDIO-VISUAL TEACHING APPARATUS

BACKGROUND OF THE INVENTION

1. Field of the Invention

This invention relates to an improvement in audio-visual teaching devices. More specifically, this invention relates to audio-visual teaching devices utilizing opaque, Hollerith-type cards including a magnetic strip for recording audio information thereon. This invention relates to improvements in the information card and in the illumination system designed for displaying the information contained on the card.

2. Description of the Prior Art

During many years of teaching experience, this inventor has contacted on a professional basis many students who have not been able to read adequately. These students appear to be intelligent from informal observations of their activities, their interactions with peer groups, their conversations, and their group discussions. However, there seems to be some type of blockage between their sensory perceptions and the linkage of the signals to the brain. This blockage may be either physical or psychological, but in any event it must be overcome.

The prior art contains many examples of presently available teaching devices which utilize the standard forms of stimulation to the tactile, visual and auditory senses to promote the learning process. However, even when these teaching devices are utilized in attempting to teach new information to these reading disadvantaged children, the rate in which the children absorb the information is still below the apparent potential of each of the students.

The clearest example of the prior art audio-visual teaching apparatus is the LANGUAGE MASTER (Trademark) developed and marketed by the Bell and Howell Company of Chicago, Ill. Various elements of this system are disclosed by Kral in U.S. Pat. Nos. 3,712,973 and 3,760,164 as well as the disclosures of Pietenpol in U.S. Pat. No. 3,821,519 and Lorbergs in U.S. Pat. No. 3,840,896. MacChesney in U.S. Pat. No. 2,603,006 discloses audio-visual teaching aid of a type which is very similar to the LANGUAGE MASTER. The present invention relates to an improvement which may be adapted for use with either of these previously discussed teaching systems.

Other inventors have likewise sought to improve upon the teaching capacity of the prior art inventions. Butler, in U.S. Pat. No. 4,007,547, discloses the use of a dual track magnetic strip attached to the card for allowing the student to compare his pronunciation of the word with the accepted pronunciation. Sakuma, in U.S. Pat. No. 4,019,263, discloses a teaching aid employing a first card and a second overlay card which are both transported back and forth in a transverse manner before the eyes of the student. While the Sakuma teaching aid employs both audio and visual teaching stimuli, the apparatus apparently does not provide back illumination of the major area of the cards, nor does it allow the student to select the color of stimulus most suited to his personal needs.

Allain in U.S. Pat. No. 3,823,492 discloses a teaching aid utilizing a plurality of color-coded card groups, color-coded progress charts and color-coded tests for organizing the vocabulary education of young students. This system does not include any audio reinforcement of the visual information, nor does it include any illumination features.

Day, in U.S. Pat. No. 3,938,139, discloses an electronic audio-visual teaching system which utilizes reels of magnetic tape for storing electronic signals representative of the visual material to be displayed to the student. This system apparently does not include any audible stimulation or color stimulation to enhance the rate of learning.

Sampson in U.S. Pat. No. 2,985,069 discloses an apparatus for projecting slides in sequence accompanied by appropriate audio subject matter. Shields in U.S. Pat. No. 2,975,672 discloses a system for combining the audio information reproduced from a magnetic tape recorder with the visual information reproduced by a film projector. Neither of these systems provide means for the students to change the color of illumination used to display the visual information.

Hicks, in U.S. Pat. No. 2,822,425, discloses an educational book having magnetically encoded sound strips arranged along the edge of the pages thereof and a manually traversed reproduction system for decoding the signals on the magnetic strip. Chernowitz, in U.S. Pat. No. 3,767,208, discloses a teaching card having both visual printed material and a plurality of magnetically coded strips thereon. A manual magnetic reproducer is provided for allowing the student to decode the audio information recorded on the magnetic strips. MacChesney, in U.S. Pat. No. 2,849,542, discloses an apparatus for the magnetic recording of sound information on teaching cards.

Bender, in U.S. Pat. No. 3,185,776, discloses a teaching aid employing an overhead projector for projecting large transparent slides which include magnetically encoded strips along one edge thereof. The slides are fixed in position with respect to the illumination and projection sub-systems, and a moveable magnetic reproduction head is transported on an extendable arm over the length of the magnetic strip. While this system utilizes a rear projection technique for displaying the visual information, a magnetically encoded strip, and a magnetic reproducer for displaying the audio information, this system does not include optical filtering or other functionally equivilant sub-systems for allowing the viewer or student to vary the display color of the visual information in order to increase the impact of the learning process.

SUMMARY OF THE INVENTION

The present invention relates to a teaching apparatus of the type utilizing concurrent audio and visual reinforcement to improve the learning of information by the operator or student. The apparatus includes a first medium for storing thereon a visual signal representative of the visual information to be displayed to the operator. A second medium is included for storing thereon an audio signal representative of the audio information to be displayed to the student. Audio reproduction means are provided for coacting with the audio signal on the second medium to produce an audible display of the audio information. Visual reproduction means are provided for coacting with the visual signal of the first medium to produce a visual display of the visual information. Color means are coupled to the visual reproduction means for allowing the student to select one of a plurality of colors in which the visual information is to be displayed. In this manner the operator may select the color in which the visual information is to be displayed in order to improve the rate and retention factors of the learning process.

BRIEF DESCRIPTION OF THE DRAWINGS

Other objects, features and advantages of the present invention will be apparent from a study of the written description and the drawings in which:

1. FIG. 1 illustrates a frontal perspective view of an audio-visual teaching aid adapted to incorporate the rear illumination and color selection subsystem of the present invention.
2. FIG. 2 is a schematic electrical and mechanical illustration representing an end section view of the apparatus illustrated in FIG. 1.
3. FIG. 3 is a frontal elevation of a typical information card including the outlined alphnumeric apertures therethrough.
4. FIG. 4 illustrates typical examples of the construction of the outlined alphanumeric apertures in the information card.

DETAILED DESCRIPTION OF THE PREFERRED EMBODIMENT

As illustrated in FIGS. 1, 2 and 3 of the drawings, the present invention includes an information storage medium comprising an information storage card 10, having information stored thereon, an illumination or visual reproduction system 50, and a color filtering system 70.

The present invention will be illustrated in conjunction with a LANGUAGE MASTER (trade mark) instructional device produced by the Bell and Howell Company of Chicago, Ill. However, the present invention should not be limited to this particular embodiment which has been specifically adapted for use with the LANGUAGE MASTER system, since other functionally equivalent embodiments may also be utilized with other audio-visual teaching systems.

The basic audio-visual instruction system includes a first recording medium, such as the generally opaque Hollerith-type information card 10, having recorded thereon the visual information 20 to be displayed to the student for the learning exercise. In the preferred embodiment of the present invention the visual information is expressed by a plurality of patterned apertures 21-24 which communicate between the two planar sides of the information storage card 10. These pattered apertures are formed in the shape of alphanumeric symbols 20 which communicate to the student the information to be learned. These alphanumberic symbols 20 may be letters, numbers or other commonly recognized symbols of one or more languages in which the instruction is to be based.

As a further visual aid to the student, the peripheral sections of the information card 10 which define the alphanumeric apertures 20 therein are outlined in a dark colored ink 26 in order to cause the alphnumeric letters 20 to be visually differentiated from the background of the information card 10.

The pattern of the alphanumeric symbol which is used in the preferred embodiment of the present invention has been chosen to be visually equivalent to the style of printing used in childrens textbooks. The size and shape of each of the alphanumeric symbols has been specifically adapted to facilitate the decoding of each of the symbols. For example, these alphanumeric symbols 20 are especially well suited for the child with a reading disability such as a decoding reversal (which causes the child to confuse similar but different letters, such as confusing "b" with "d"). Each of these alphanumeric patterns has been carefully chosen to maximize the critical aperture areas to aid in the visual discrimination by the student. The outlining of each of these alphanumeric patterns 20 in black or another similar dark colored ink 26 aids in the visual decoding process. The normal rules of capitalization and punctuation should be closely followed so that the students learn the proper appearance of the language from the initial lessons.

The information card 10 also includes thereon a magnetic strip shown generally as 12. This magnetic strip 12 is positioned longitudinally adjacent the lower edge of the information card 10 and is generally parallel thereto. The magnetic strip 12 has magnetically recorded thereon an audio signal representative of the information to be learned.

As illustrated in FIGS. 1 and 2, the information card 10 is adapted to be transported through a card channel 41 formed within the audio-visual teaching apparatus, shown generally as 40. The information card 10 may be driven through the card channel 41 by a special purpose capstan and motor system, shown generally as 48. This transport system 48 may be similar in design to those systems disclosed by Kral (as described in the preceeding discussion). This transport drive system 48 may include a dual speed system, an automatic bi-directional drive system or another similar system which has been designed for the application at hand.

The card guide 41 is spaced to allow a record/reproduce tape head 31 to operably couple with the magnetic strip 12 as the information card 10 moves longitudinally through the card guide 41. The electrical output of the record/reproduce head is coupled through the electrical cable 32 to an audio record and reproduction system, shown generally as 30 in FIG. 2. The electronic output signal is then amplified and coupled through the electrical cable 36 to drive the loudspeaker 35 for audibly displaying the audio information recorded on the magnetic strip 12 to the student.

A microphone 33 is coupled by the electrical cable 34 to the input of the audio record and reproduction system 30. The signal from the microphone 33 is amplified and added to a bias signal, with the resulting composite output being coupled along the electrical cable 32 to the record/reproduce head 31. In this manner the teacher, student or other operator may record specific audio information upon the magnetic strip 12 as the information card 10 is transported through the card guide 41.

It will of course be understood by one skilled in the art that it is not necessary to include the magnetic strip 12 or other similar audio recording material on the same medium as the visual information since it is possible to electrically or mechanically coordinate the concurrent display of the audio and visual information even when they are recorded on two different mediums.

The source of illumination, shown generally as 50 in FIG. 2, is mounted on the frame of the audio-visual teaching aid 40 at a point immediately to the rear of the card guide 41 and the information card 10. The source of illumination 50 is shown as a plurality of incandescent light bulbs, but other sources of illumination such as fluorescent lights may be used with equal effectiveness. The source of illumination 50 is enclosed within a cylindrically shaped reflector 60 having a generally rectangular shaped opening 62 in the front thereof adjacent to a rear surface of the information card 10. In this manner the illumination radiated from the rear side of the source of the illumination 50 will be reflected by the interior surface of the cylindrical reflector 60 to be re-radiated through the generally rectangular openings 62 at the front of the cylindrical reflector 60.

A generally cylindrical optical filter, shown generally as 70 in FIGS. 1 and 2, is movably coupled about the exterior surface of the cylindrical reflector 60 in order to obtain a coaxial rotation therearound. This movable coupling can be obtained through the use of a tongue-in-groove or other similar means for limiting the longitudinal motion of the optical filter as it rotates about its cylindrical axis.

As illustrated in FIGS. 1 and 2, the cylindrical optical filter 70 includes paired disc-shaped end members 76 coupled together by three longitudinally arranged supports 75. These longitudinally arranged supports 75 divide the perimeter of the cylindrical optical filter 70 into three generally equal sections. Each of these sections is occupied by a removable transparent colored filter 71, 72 and 73. These optical filters 71, 72 and 73 are colored red, blue and orange in order to modify the illumination originating from the source of illumination 50 as it proceeds through the apertures 20 in the information card 10. Since the cylindrical optical filter 70 may be rotated about the cylindrical reflector 60, the teacher or student may select the appropriate colored filter 71, 72 or 73 to optimize the optical impact of the visual information represented by the alphanumeric patterned apertures 20.

Mechanical detents may be coupled between the cylindrical optical filter 70 and the cylindrical reflector 60 for indicating the correct positioning for each of the colored filter elements 71, 72 and 73 with respect to the information card 10. While only three colored elements 71, 72 and 73 are illustrated in the preferred embodiment of this invention, it will be obvious to one skilled in the art that the same frame construction can be modified to include additional colored filter elements as required.

The operation of the preferred embodiment of the present invention may be best illustrated by explaining the experimental results from testing the present invention on reading disadvantaged students. A group of second grade students from a Florida primary school were chosen for the experiment. A pre-test was administered to the children to determine their initial range of vocabulary as chosen from the Dolch word list (Edward W. Dolch, TEACHING PRIMARY READING, Gerrard Press, Champaign, Ill., 1941, Pg. 205). During this test each word from the Dolch word list was placed on one of the information cards 10. The control group received information cards 10 having the appropriate word printed thereon in large black letters. The experimental group received the information cards 10 having the patterned apertures 20 therein representative of the appropriate word. During the experimental phase of the study, each child received a minimum of five information cards per day.

The control group used the standard LANGUAGE MASTER system without any back-lighting provisions. The experimental group utilized the information cards 10 having the patterned apertures 20 therethrough and utilized a LANGUAGE MASTER machine having the source of illumination 50 and the colored filter elements 70 attached thereto. In this manner the patterned apertures 20 in the information card 10 were illuminated from the rear with a selectable colored illumination. For this particular experiment, the filter element 71 was chosen to produce red color of illumination, since the color red makes the words appear closer to the reader and has more visual impact.

The magnetic strip 12 was recorded with the pronunciation of the separate letters comprising the word and then the correct pronunciation of the entire word. The reader was encouraged to move the information card 10 back and forth within the card guide 41 in front of the source of illumination 50, thereby exposing the sound of the letters, the shape of the letters, the shape of the word and the sound of the word to the student for multiple consecutive learning experiences. This type of self drill was encouraged. This pairing of the visual and audio stimulation, together with the additional color stimulation provided to students in the experimental group, significantly increased the rate of retention in the vocabulary words which were learned by the students in the experimental group. The addition of back-lighting and the color stimulus was especially helpful for the children having visual discrimination problems who could not immediately recognize the letters.

Each member of the group was given five cards each day, and the previously learned vocabulary was reviewed each day in addition to the new vocabulary words. In some cases the students received up to 10 cards each day.

The results of these tests were most encouraging. The experimental group learned a total of 223 words during the entire 37 day testing period, while the control group learned only 125 words. One of the most important and unexpected findings of the testing phase of this experiment was that in many cases the student's learning was first evident at a time subsequent to the time in which the information was actually taught. This amount of "after-learning" which occured in the experimental group was 1.484 times, while the control group exhibited a factor of 1.6447 increase. However, the total number of words learned by the respective groups were vastly different. The experimental group learned a total of 157 words during the experimental phase (20 days) while the control group learned only 125 words for the entire testing phase (approximately 37 days). Therefore, the experimental group learned more in just the first 20 days of the testing than did the control group for the entire testing phase of approximately 37 days.

When the statistical results of this experiment were analyzed, the results were determined to be statistically significant. The complete statistical results and evaluation of these experiments are discussed in "The Effectiveness of Color and Light, Paired with Sound in Remedial Reading Deficiencies" by Joy H. Orth, Copyright 1977, which is hereby incorporated in its entirety by reference.

The results of this experiment strongly suggest that the back lighting with colored illumination, when paired with the phonetic representation of the spelling and pronunciation of the word, significantly increase the learning of vocabulary words and also increase the retention of the vocabulary words in reading disadvantaged students. Recent observations have indicated that while female children respond more favorable to the color red, male children respond more favorably to the color blue. Both male and female children respond approximately equally to the color orange. Therefore, it is important that the individual student be able to optimize the color of the back-illumination of the alphanumeric apertures 20 to enhance the learning process. Therefore, the preferred embodiment of the present invention employs movable colored filters 71, 72 and 73 for allowing the student to change the color of the back-illumination of the alphanumeric apertures 20. Filters of other colors may also be used.

It should be reemphasized at this time that the method of illuminating the vocabulary word with light of a specific color chosen by the student can be implemented in a variety of different embodiments. For example, the visual information could be presented through the use of colored slides and the audio information could be recorded on separate reels of magnetic tape. Likewise, a computer terminal presentation having a multi-colored capability would suffice for the visual representation in accordance with this invention. The important factor is the subliminal stimulus provided by the colored illumination of the vocabulary word in conjunction with the audio stimulation concurrent therewith.

While for the purposes of description a first preferred embodiment of the invention has been described, it will be apparent to one skilled in the art that changes and modifications can be made therein without departing from the spirit of the invention or the scope of the appended claims. The present invention should not be limited in its application to the details illustrated in the accompanying drawings or the specification, since it will be understood that the terminology and description employed therein are used solely for the purpose of describing the construction and general operation of the preferred embodiment. Nor should the terminology and descriptions used herein be construed as limitations on the operability of the invention.

I claim:

1. A teaching apparatus of the type utilizing concurrent audio and visual reinforcement to improve the learning of information by the student, said teaching apparatus comprising in combination:
   a first medium for storing thereon a visual signal representative of the visual information to be displayed for learning, with said first medium comprising a generally opaque object, and with said visual signal comprising a plurality of patterned apertures through said opaque object;
   a second medium for storing thereon an audio signal representative of the audio information to be displayed for learning;
   audio reproduction means for coacting with said audio signal on said second medium for producing an audible display of the audio information to be learned by the student;
   visual reproduction means for coacting with said visual signal on said first medium for producing a visual display of the visual information to be learned by the student, with said visual reproduction means comprising light means for providing illumination through said patterned apertures; and
   color means coupled to said visual reproduction means for allowing the student to select one of a plurality of colors in which the visual information is displayed, whereby the student may select the color in which the visual information is to be displayed in order to improve the learning process.

2. The teaching apparatus as described in claim 1 wherein
   said visual reproduction means is operatively disposed adjacent said opaque object, whereby said visual information is displayed to the student by back-lighting said patterned apertures within said opaque object.

3. The teaching apparatus as described in claim 2 wherein said color means comprises optical filter means operably interposed between said light means and the student for filtering the color of light passing therebetween.

4. The teaching apparatus as described in claim 3 wherein said optical filter means comprises a plurality of operably interchangeable filters interposed between said light means and said opaque object for filtering the color of light passing therebetween.

5. The teaching apparatus as described in claim 4 wherein said plurality of operably interchangeable filters include the colors red, blue and orange.

6. The teaching apparatus as described in claim 4 wherein said opaque object comprises an information card with said patterned apertures therethrough comprising alphanumeric figures representing the visual language representation of the visual information.

7. The teaching apparatus as described in claim 6 wherein:
   said second medium comprises a magnetically sensitive strip attached to said information card for having said audible signal magnetically recorded thereon; and wherein
   said audio reproduction means comprises magnetic playback means for coacting with said magnetically sensitive strip for decoding said aubible signal into audible information displayed to the student.

8. The teaching apparatus described in claim 7 wherein said audio reproduction means further comprises in combination:
   drive means for transporting said information card and said magnetically sensitive strip thereon past said magnetic playback means; and
   guide means for receiving said information card therein and for maintaining operative registration between said magnetic strip, said magnetic playback means, said patterned apertures and said light means as said information card is transported by said drive means.

9. The teaching apparatus as described in claim 7 wherein said plurality of filters are positioned about a circumference of a rotatable cylinder having a void therein, with said light means being located within said void.

10. An improved teaching apparatus of the type wherein an audio signal is recorded on a magnetic strip attached to an opaque information card and the information card is transported past a playback system for reproducing an audible representation of the audio signal thereon, wherein the improvement comprises:
    a plurality of outlined alphanumeric patterns on the information card representative of the visual information to be displayed, with said alphanumeric patterns substantially defining the periphery of congruent alphnumeric apertures through the information card;
    illumination means operably positioned adjacent the path of the information card for illuminating said alphnumeric apertures therein; and
    filter means optically interposed between said illumination means and the viewer for controlling the color of illumination passing therebetween, said filter means including a plurality of filters operably selectable by the viewer, whereby the viewer may select the color in which the visual information is to be displayed concurrently with the audible signal in order to improve the learning process.

11. The improved teaching apparatus as described in claim 10 wherein the information card is interposed between said illumination means and the viewer for providing a back-lighted illumination of said alphanumeric apertures within the information card.

12. The improved teaching apparatus as described in claim 11 wherein said plurality of filters are positioned about the circumference of a rotatable cylinder having a coaxial void therein, with said illumination means being located within said coaxial void.

13. The improved teaching apparatus as described in claim 12 wherein said plurality of filters will produce illumination of the red, blue and orange colors.

14. A teaching apparatus of the type utilizing concurrent audio and visual reinforcement to improve the learning of information by the student, said teaching apparatus comprising in combination:
- a first medium for storing thereon a visual signal representative of the visual information to be displayed for learning;
- a second medium, attached to said first medium, for storing thereon an audio signal representative of the audio information to be displayed for learning;
- audio reproduction means for coacting with said audio signal on said second medium for producing an audible display of the audio information to be learned by the student;
- visual reproduction means for coacting with said visual signal on said first medium for producing a visual display of the visual information to be learned by the student; and
- color means coupled to said visual reproduction means for allowing the student to select one of a plurality of colors in which the visual information is displayed, whereby the student may select the color in which the visual information is to be displayed in order to improve the learning process.

15. The teaching apparatus as described in claim 14 wherein:
- said first medium comprises a generally opaque object, with said visual signal comprising a plurality of patterned apertures through said opaque object; and wherein
- said visual reproduction means is operatively disposed adjacent said opaque object and comprises light means for providing illumination through said patterned apertures, whereby said visual information is displayed to the student by back-lighting said patterned apertures within said opaque object.

16. The teaching apparatus as described in claim 15 wherein said color means comprises optical filter means operably interposed between said light means and the student for filtering the color of light passing therebetween.

17. The teaching apparatus as described in claim 15 wherein:
- said opaque object comprises an information card with said patterned apertures therethrough comprising alphanumeric figures representing the visual language representation of the visual information, and wherein
- said second medium comprises a magnetically sensitive strip attached to said information card for having said audible signal magnetically recorded thereon; and wherein
- said audio reproduction means comprises magnetic playback means for coacting with said magnetically sensitive strip for decoding said audible signal into audible information displayed to the student.

* * * * *